United States Patent
Bergmann et al.

(10) Patent No.: US 9,260,590 B2
(45) Date of Patent: Feb. 16, 2016

(54) FLAME-PROOFED POLYMER COMPOSITIONS

(75) Inventors: Gerd Bergmann, Hamburg (DE); Manuel La Rosa, Köln (DE); Andreas Roos, Düsseldorf (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 13/517,269

(22) PCT Filed: Dec. 20, 2010

(86) PCT No.: PCT/EP2010/070290
§ 371 (c)(1),
(2), (4) Date: Jan. 30, 2013

(87) PCT Pub. No.: WO2011/076760
PCT Pub. Date: Jun. 30, 2011

(65) Prior Publication Data
US 2013/0131238 A1    May 23, 2013

(30) Foreign Application Priority Data
Dec. 21, 2009  (EP) .................................. 09180183

(51) Int. Cl.
| | |
|---|---|
| *C08K 3/22* | (2006.01) |
| *C08K 5/5313* | (2006.01) |
| *C08K 13/02* | (2006.01) |
| *C08L 31/04* | (2006.01) |
| *C09K 21/00* | (2006.01) |
| *C09K 21/04* | (2006.01) |
| *C09K 21/12* | (2006.01) |

(52) U.S. Cl.
CPC . *C08K 13/02* (2013.01); *C08K 3/22* (2013.01); *C08K 5/5313* (2013.01); *C08L 31/04* (2013.01); *C09K 21/00* (2013.01); *C09K 21/04* (2013.01); *C09K 21/12* (2013.01)

(58) Field of Classification Search
CPC ........ C08K 3/22; C08K 5/5313; C08K 13/02; C09L 31/04; C09K 21/00; C09K 21/04; C09K 21/12; C08L 31/04
USPC .......................................................... 524/133
See application file for complete search history.

(56) References Cited

U.S. PATENT DOCUMENTS

| | | |
|---|---|---|
| 5,059,651 A | 10/1991 | Ueno |
| 6,270,560 B1 | 8/2001 | Kleiner et al. |
| 6,420,459 B1 | 7/2002 | Horold |
| 2005/0004277 A1* | 1/2005 | Hoerold et al. ................. 524/99 |
| 2006/0074157 A1* | 4/2006 | Bauer et al. ................... 524/115 |
| 2006/0089435 A1 | 4/2006 | Hoerold et al. |
| 2006/0214144 A1 | 9/2006 | Bauer et al. |
| 2007/0299171 A1 | 12/2007 | Couillens et al. |
| 2009/0255707 A1* | 10/2009 | Moriuchi et al. ........ 174/110 SR |
| 2013/0123398 A1* | 5/2013 | Roos et al. ..................... 524/100 |

FOREIGN PATENT DOCUMENTS

JP    2005200574 A  *  7/2005  .............. C08L 31/04

OTHER PUBLICATIONS

English language machine translation of JP 2005200574, Jul. 2005.*
European Search Report from co-pending Application EP09180183, dated Feb. 2, 2010, 2 pages.

* cited by examiner

*Primary Examiner* — Angela C Scott

(57) ABSTRACT

The invention relates to a flame-proofed polymer composition that can be obtained form one or more α-olefin-vinyl acetate copolymers, having a vinyl acetate content of 40 to 90 wt %, relative to the total weight of the α-olefin vinyl acetate copolymers, and from a synergistic flame-proofing material combination, comprising, as component A, a phosphinic acid salt of the formula (I), where $R_1$, $R_2$ are $C_1$-$C_6$-alkyl, preferably $C_1$-$C_4$-alkyl, linear or branched; M is calcium, aluminum, zinc ions; m is 2 or 3; and, as component B, a metal hydroxide, preferably aluminum hydroxide (ATH).

9 Claims, 3 Drawing Sheets

FLAME-PROOFED POLYMER COMPOSITIONS

Figure 1:
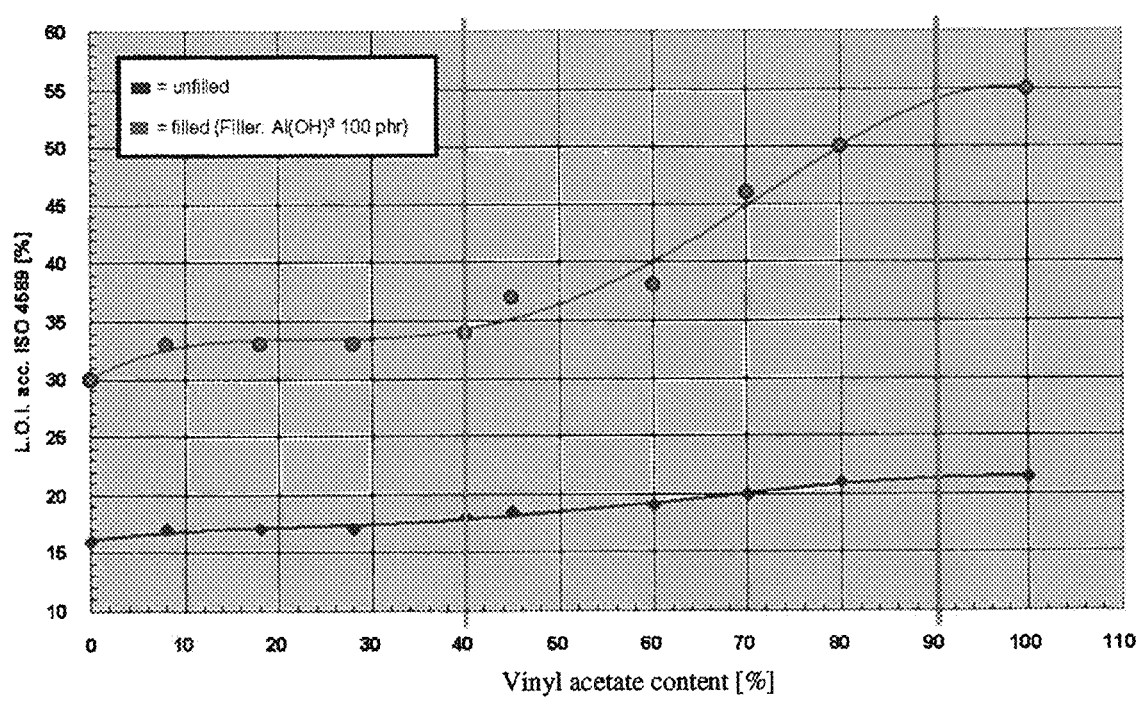

The present invention relates to a flameproofed polymer composition consisting of one or more α-olefin/vinyl acetate copolymers having a vinyl acetate content of 40 to 90% by weight, based on the total weight of the α-olefin/vinyl acetate copolymer, the use thereof and a flameproofing combination for the treatment of plastics and rubbers.

Flameproofed polymer compositions are used, for example, in cable applications (cable sheath and cable insulation) and floor coverings. Such polymer compositions should provide sufficient flameproofing complying with the statutory standards and moreover should have outstanding processing properties.

It has long been known that polymer systems can be treated with inorganic flameproofing agents, halogenated flameproofing agents, organophosphorus flameproofing agents or nitrogen-based flameproofing agents.

Metal hydroxides, in particular aluminium hydroxides (ATH) and magnesium hydroxides (MDH), which are used as flame-retardant fillers in polymers, may be mentioned as mineral flameproofing agents. Metal hydroxides are used alone or in combination with one another and optionally in combination with further flameproofing additives.

The flameproofing effect is based substantially on an endothermic decomposition of the crystals, the release of water in the form of water vapour with simultaneous dilution of the concentration of flammable gases in the vicinity of the plastic attacked and the formation of a more or less solid oxide residue. The oxide residue itself has a large internal surface area and can therefore adsorb soot particles or precursors of the soot (polycyclic aromatic hydrocarbons, PAH). The so-called ash layer has the function of mechanically stabilizing the burning polymer so that, for example, dripping of flaming particles of the polymer is reduced or completely avoided. Furthermore, the encrusted ash layer on the surface of the burning polymer acts as a sort of "protective barrier" for the polymer layers present underneath, with the result that rapid further burning can be avoided.

The use of metal hydroxides in α-olefin/vinyl acetate copolymers has proved particularly useful.

However, the large amounts of metal hydroxides added to plastic mixtures in order to ensure sufficient flameproofing of the plastic are disadvantageous. The physical properties (mechanical and electrical characteristics) of the plastic are adversely affected thereby.

Furthermore, salts of phosphinic acids (phosphinates) have proved to be effective flame-retardant additives for polymer systems. Calcium and aluminium phosphinates have been described as being particularly effective in polyesters or polyamides and adversely affect the material properties of the polymer masses to a lesser extent than, for example, alkali metal salts.

Synergistic combinations of phosphinates with certain nitrogen-containing compounds, which in Many polymers act more effectively as flameproofing agents than the phosphinates alone have also been found. For example, melamine and melamine compounds are known to be effective synergistic agents, such as, for example, melamine cyanurates and melamine phosphate.

It is therefore an object of the present invention to provide a polymer composition in which the degree of filling of the metal hydroxide is reduced, whereby the flameproofing effect at least remains the same or is improved but the mechanical properties of the polymer are improved and especially the hardness is reduced.

For achieving this object, the present invention proposes a flameproofed polymer composition of the type mentioned at the outset, which consists of one or more α-olefin/vinyl acetate copolymers having a vinyl acetate content of 40 to 90% by weight, based on the total weight of the α-olefin/vinyl acetate copolymer, and of a synergistic flameproofing combination containing, as component A, a phosphinic acid salt of the formula (I)

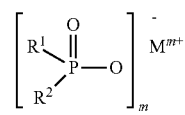

in which
$R^1$, $R^2$ denotes $C_1$-$C_6$-alkyl, preferably $C_1$-$C_4$-alkyl, linear or branched;
M denotes calcium, aluminium or zinc ions;
m denotes 2 or 3,
and, as component B, a metal hydroxide, preferably aluminium hydroxide (ATH).

Here, component A is also designated as phosphinates.

Surprisingly, it was found that, by means of the addition of metal hydroxides and phosphinates, the flameproofing is significantly improved with at the same time improvement of the mechanical properties and the flexibility of the material.

Various parameters are used for assessing the flameproofing.

One indicative value for assessing the flameproofing and in particular the ignitability is the limiting oxygen index (LOI) according to ISO 4589. It describes the minimum concentration of oxygen in an oxygen mixture which is just capable of supporting the combustion of a vertically oriented test specimen. At lower oxygen concentration, the flame is extinguished. High LOI values therefore denote high flameproofing or low ignitability.

Further characteristics relevant for the flameproofing can be determined using the cone calorimeter, such as, for example:
the "peak heat release rate" in KW/m² (PHRR); this is the maximum power output per unit area, which was measured in the cone calorimeter during combustion of the sample. The lower the PHRR, the better is the flameproofing of the sample.
the "time to ignition" (TTI); this is the time when the sample begins to burn due to the heat emission in the cone calorimeter. The higher the TTI value, the better is the flameproofing of the sample.

A further method for assessing and classifying the flammability of plastics is the UL 94 specification. The UL 94 classification is carried out with 3.2 mm thick samples. According to UL 94-V standard, the classifications are not classified (NC), V2 (better), V1 (better still), V0 (highest classification).

Preferably, component A is an aluminium phosphinate.

The total amount of synergistic flameproofing combinations is preferably between 110 and 280 phr, particularly preferably between 80 and 190 phr.

The polymer composition according to the invention preferably has 100 to 190 phr of component B and 10 to 90 phr of component A, particularly preferably 130-160 phr of component B and 20-40 phr of component A.

Preferably, the polymer composition according to the invention has 160 phr of ATH and 30 phr of aluminium phosphinate.

Here, "phr" means parts per hundred rubber.

The α-olefin/vinyl acetate copolymers used are distinguished by high vinyl acetate contents of ≥40% by weight, based on the total weight of the α-olefin/vinyl acetate copolymers. Preferably, the vinyl acetate content of the α-olefin/vinyl acetate copolymers used according to the invention is 50% by weight to 80% by weight, based on the total weight of the α-olefin/vinyl acetate copolymers.

The α-olefin/vinyl acetate copolymer used may have one or more further comonomer units (e.g. terpolymers), for example based on vinyl esters and/or (meth)acrylates, in addition to the monomer units based on α-olefin and vinyl acetate. The further comonomer units are—if further comonomer units are present in the α-olefin/vinyl acetate copolymer—present in a proportion of up to 10% by weight, based on the total weight of the α-olefin/vinyl acetate copolymer, the proportion of the monomer units based on the α-olefin decreasing correspondingly. Thus, for example, α-olefin/vinyl acetate copolymers which are composed of 40% by weight to 90% by weight of vinyl acetate, 10% by weight to 60% by weight of α-olefin and 0 to 10% by weight of at least one further comonomer can be used, the total amount of vinyl acetate, α-olefin and the further comonomer being 100% by weight.

In the α-olefin/vinyl acetate copolymers used, all known α-olefins can be employed as α-olefins. The α-olefin is preferably selected from ethene, propene, butene, in particular n-butene and isobutene, pentene, hexene, in particular 1-hexene, heptene and octene, in particular 1-octene.

It is also possible to use higher homologues of said α-olefins as α-olefins in the α-olefin/vinyl acetate copolymer. The α-olefins may furthermore carry substituents, in particular $C_1$-$C_5$-alkyl radicals. Preferably, however, the α-olefins carry no further substituents. Furthermore, it is possible to use mixtures of two or more different α-olefins in the α-olefin/vinyl acetate copolymer. However, it is preferable not to use mixtures of different α-olefins. Preferred α-olefins are ethene and propene, ethene being particularly preferably used as α-olefin in the α-olefin/vinyl acetate copolymer.

Thus, the preferably used α-olefin/vinyl acetate copolymer is an ethylene/vinyl acetate copolymer.

Particularly preferred ethylene/vinyl acetate copolymers have a vinyl acetate content of 50% by weight to 80% by weight.

Usually, the preferably used ethylene/vinyl acetate copolymers having high vinyl acetate contents are designated as EVM copolymers, the "M" in the designation indicating the saturated backbone of the methylene main chain of the EVM.

The α-olefin/vinyl acetate copolymers used, preferably ethylene/vinyl acetate copolymers, have in general MFI values (g/10 min), measured according to ISO 1133 at 190° C. and a load of 21.1 N, of 1 to 40, preferably 1 to 35.

The Mooney viscosities according to DIN 53 523 ML 1+4 at 100° C. are in general 3 to 80, preferably 20 to 65, Mooney units.

The number average molecular weight (Mw), determined by means of GPC, is in general from 5000 g/mol to 800 000 kg/mol, preferably 100 000 g/mol to 400 000 g/mol.

Ethylene/vinyl acetate copolymers which are commercially obtainable, for example, under the trade name Levapren® or Levamelt® from Lanxess Deutschland GmbH are particularly preferably used in the flameproofed polymer composition according to the invention.

The flameproofed polymer composition according to the invention preferably has an LOI of at least 30% and a maximum hardness of 90 Shore A.

The flameproofed polymer composition according to the invention can be used in plastics and rubbers, thermoplastic elastomers or thermoplastic vulcanizates.

A further invention is the use of the flameproofed polymer composition according to the invention for the production of cables, plastic moulding materials, resilient moulding materials, floor coverings (particularly in public means of transport or buildings), electrical, coated conductors and adhesives.

It is therefore conceivable also to use the flameproofed polymer composition according to the invention in blends. For example, the following polymers are suitable here: HNBR, EPDM, EVA, HDPE, LDPE, polyamide and/or copolyester.

For example, cable sheaths for certain areas must be oil-resistant since oil incorporated by steeping impairs the function at the latest in the event of a fire and additionally increases the fume density. Furthermore, the cables must remain flexible even at temperatures below minus 40° C. and must exhibit good electrical insulation properties so that they operate reliably even in the case of small wall thicknesses.

It is also conceivable to use maleic anhydride-grafted EVM/EVA in the blend. The vinyl acetate content for the grafted EVM/EVA is 18 to 90% by weight, based on the total weight of the α-olefin/vinyl acetate copolymer, preferably 32 to 80% by weight and very particularly preferably 40 to 70% by weight. The content of MAHg EVM/EVA is preferably 5 to 50 phr, more preferably 10 to 40 phr and particularly preferably 10 to 20 phr.

A further invention is also a flameproofing combination for the preparation of a flameproofed polymer composition comprising one or more α-olefin/vinyl acetate copolymers having a vinyl acetate content of 40 to 90% by weight, based on the total weight of the α-olefin/vinyl acetate copolymer, characterized in that said combination contains an aluminium phosphinate as component A and a metal hydroxide, preferably aluminium hydroxide (ATH), as component B.

A vinyl acetate content of 50-80% by weight, based on the total weight of the α-olefin/vinyl acetate copolymer, is preferred.

It has been found that this combination has an outstanding flameproofing effect which is particularly suitable for said α-olefin/vinyl acetate copolymer with respect to simultaneously low hardness.

Furthermore, the flameproofed polymer composition according to the invention has relatively low concentrations of toxic fumes in the case of fire according to EN ISO 5659-2. In particular, it has for example no HCl gas since the α-olefin/vinyl acetate copolymer is halogen-free.

The cables, cable sheaths, plastic moulding materials, resilient moulding materials, floor coverings and electrical, coated conductors produced therefrom remain flexible even at temperatures below −40° C.

The flameproofing combination according to the invention preferably has 100 to 190 phr of component B and 10 to 90 phr of aluminium phosphinate, particularly preferably 130-160 phr of component B and 20-40 phr of aluminium phosphinate.

Preferably, the flameproofing combination according to the invention comprises 160 phr of ATH and 30 phr of aluminium phosphinate.

The flameproofing combination according to the invention is suitable for the treatment of plastics and rubbers, thermoplastic elastomers or thermoplastics vulcanizates.

It is preferably used in ethylene/vinyl acetate copolymers which are commercially obtainable, for example, under the trade name Levapren® or Levamelt® from Lanxess Deutschland GmbH, or in blends with HNBR, EPDM, EVA, HDPE, LDPE, polyamides and/or copolyesters.

The flameproofing combination according to the invention is halogen-free and, owing to the low viscosity and good compatibility with polar fillers, can take up large amounts of inorganic flameproofing agents, such as aluminium hydroxide. When compounds containing the flameproofing combination according to the invention burn, only fumes of low density form. HCl gas, for example, which forms on combustion of halogen-containing compounds, cannot be given off at all by pure ethylene/vinyl acetate copolymers, owing to their chemical composition. These advantages are displayed in particular in railway traffic or in buildings; there, people should be able to leave the areas affected by fire without external help; this also certainly includes the escape routes remaining visible for a long time.

Preferably, the total amount of synergistic flameproofing combinations is between 110 and 280 phr, particularly preferably between 80 and 190 phr, for the abovementioned uses.

Figure 2:
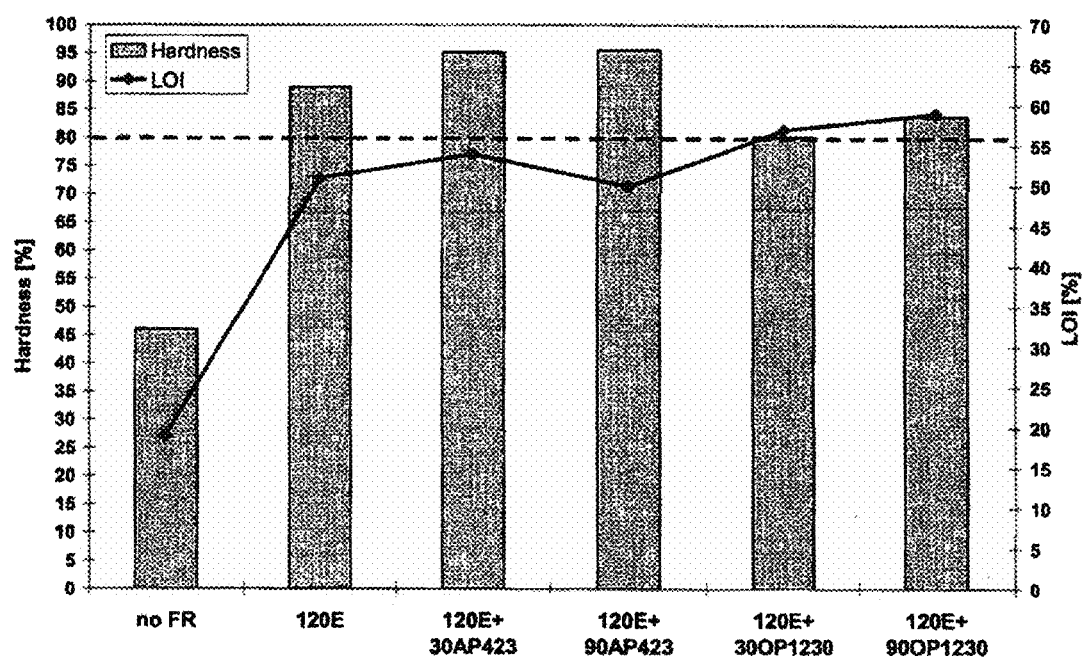

The invention will be explained in more detail below with reference to examples:

FIG. 1: Graph of LOI values of α-olefin/vinyl acetate copolymers with and without ATH FIG. 2: Graph relating to Tab. 1, hardness and LOI FIG. 3: Graph relating to Tab. 2, elongation at break and LOI FIG. 1 shows an increase in the LOI value with the use of ATH, in particular as soon as the vinyl acetate content (VA) of the α-olefin/vinyl acetate copolymer exceeds 40% by weight. In the case of an increase from 0 to 40% by weight of VA, the LOI increases by about 15% (LOI: 30%=>LOI: 35%). In the case of an increase from 40 to 80% by weight of VA, the LOI increases by about 40% (LOI: 35%=>LOI: 50%).

TABLE 1 lists a series of formulations and their LOI values and plastics properties.

| Formulation: | N 0 | N 1 | N 2 | N 3 | N 4 | N 5 |
|---|---|---|---|---|---|---|
| LEVAPREN 600 HV | 100 | 100 | 100 | 100 | 100 | 100 |
| APYRAL 120 E |  | 190 | 160 | 100 | 160 | 100 |
| PERKADOX 14-40 B-PD | 6 | 6 | 6 | 6 | 6 | 6 |
| RHENOFIT TAC/S | 1 | 1 | 1 | 1 | 1 | 1 |
| EXOLIT AP 423 |  |  | 30 | 90 |  |  |
| EXOLIT OP 1230 |  |  |  |  | 30 | 90 |
| Total phr | 107 | 297 | 297 | 297 | 297 | 297 |
| Hardness [Shore A] | 46 | 89 | 95 | 96 | 80 | 84 |
| Elongation at break [%] | 223 | 288 | 354 | 316 | 335 | 325 |
| Tensile strength [MPa] | 3.3 | 7.1 | 7.7 | 4.7 | 7.9 | 6.8 |
| LOI [%] | 19 | 51 | 54 | 50 | 57 | 59 |

N0: Levapren without flameproofing
N1: Levapren with ATH (APYRAL 120 E, from Nabaltec)
N2, N3, N4, N5: Levapren with ATH (APYRAL 120 E, from Nabaltec) and phosphinate (EXOLIT OP 1230, from Clariant) or aluminium polyphosphate (EXOLIT AP 423, from Clariant)
Perkadox 14-40 B-PD Crosslinking agent
Rhenofit TAC/S Coagent The jump in the LOI with the use of ATH (19% to 51%) and a further one with the use of EXOLIT OP 1230 (51% to 59%) are clearly evident. Surprisingly, only EXOLIT OP 1230 has advantages with respect to flameproofing and mechanical properties. The mixture N4 should be singled out in particular. With the combination of 160 phr of ATH and 30 phr of EXOLIT OP 1230, excellent values in both the LOI and elongation at break and tensile strength can be achieved. The simultaneously lowest hardness of 80 Shore A represents a unique advantage in formulating.

TABLE 2

Various formulations with Levapren and EXOLIT OP 1230 with different ATHs

| Formulation: | M 1 | M 2 | M 3 | M 4 | M 5 | M 6 | M 7 | M 8 |
|---|---|---|---|---|---|---|---|---|
| Levapren 600 HV | 100 | 100 | 100 | 100 | 100 | 100 | 100 | 100 |
| Rhenofit TAC/S | 1 | 1 | 1 | 1 | 1 | 1 | 1 | 1 |
| Perkadox 14-40 | 6 | 6 | 6 | 6 | 6 | 6 | 6 | 6 |
| Apyral 40CD | 130 |  |  |  | 69 |  |  |  |
| Apyral 60CD |  | 130 |  |  |  | 89 |  |  |
| Apyral 120E |  |  | 130 |  |  |  | 89 |  |
| Apyral 200SM |  |  |  | 130 |  |  |  | 89 |
| OP1230 |  |  |  |  | 61 | 61 | 61 | 61 |
| Total phr | 237 | 237 | 237 | 237 | 237 | 237 | 237 | 237 |
| Hardness [Shore A] | 74 | 77 | 78 | 81 | 77 | 78 | 77 | 77 |
| Elongation at break [%] | 263 | 216 | 190 | 158 | 335 | 321 | 328 | 328 |
| Tensile strength [MPa] | 5 | 7 | 9 | 9 | 8 | 7 | 8 | 8 |
| LOI [%] | 32 | 32 | 35 | 34 | 53 | 53 | 54 | 54 |
| TTI [s] | 78 | 72 | 94 | 109 | 110 | 118 | 129 | 166 |
| PHRR | 122 | 124 | 64 | 78 | 108 | 95 | 97 | 80 |
| UL-94 Rating | V1 | V0 | V0 | V0 | V1 | V0 | V0 | V0 |

OP1230 is an abbreviation for EXOLIT OP 1230.

Table 2 clearly shows a surprising effect of EXOLIT OP 1230 in combination with various ATHs, where the filler concentration of flameproofing components (ATH or combination of ATH and EXOLIT OP 1230) is 130 phr.

Significantly higher LOI values with the use of OP1230 are evident. Furthermore, the TTI is lengthened in each case by over 30 s. The PHRR remains comparable or decreases, which is likewise positive. Also particularly advantageous are the substantially higher values in the elongation at break for OP1230 mixtures in comparison with ATH alone. With comparable hardness and tensile strength, this leads to increased flexibility in the corresponding applications. Except for the formulation with Apyral 40CD, the best UL rating of V0 is always achieved.

Figure 3:
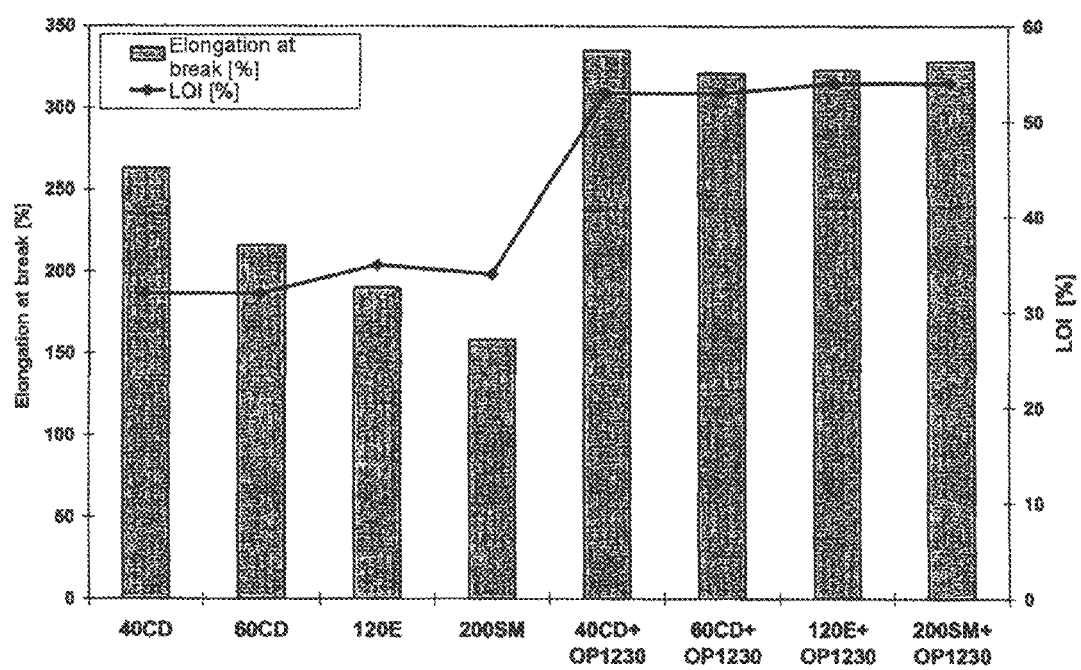

FIG. 3 shows the surprising jump in LOI and elongation at break with the use of ATH and OP1230.

What is claimed is:

1. A flameproofed polymer composition comprising:
one or more α-olefin/vinyl acetate copolymers having a vinyl acetate content of 40 to 90% by weight based on the total weight of the α-olefin/vinyl acetate copolymer, and a Melt Flow Index value of more than 1 to 40 g/10 min per ISO 1133, and
a flameproofing combination comprising:
10 to 90 phr of a phosphinic acid salt of the formula (I)

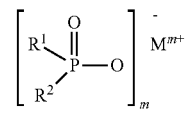

in which
$R^1$, $R^2$ denotes $C_1$-$C_6$-alkyl, linear or branched;
M denotes calcium, aluminium or zinc ions;
m denotes 2 or 3, and
100 to 190 phr of a metal hydroxide, and
wherein the composition is halogen-free.

2. The flameproofed polymer composition according to claim 1, wherein the phosphinic acid salt is an aluminium phosphinate.

3. The flameproofed polymer composition according to claim 1, wherein the total amount of flameproofing combination is between 110 phr and 280 phr.

4. The flameproofed composition according to claim 1, wherein the flameproofing combination comprises 160 phr of aluminium hydroxide and 30 phr of aluminium phosphinate.

5. The flameproofed composition according to claim 1, having an LOI of at least 35% and a hardness of not more than 90 Shore A.

6. A flameproofing combination for the preparation of a flameproofed polymer composition comprising one or more α-olefin/vinyl acetate copolymers having a vinyl acetate content of 50 to 80% by weight based on the total weight of the α-olefin/vinyl acetate copolymer, and a Melt Flow Index value of more than 1 to 40 g/10 min per ISO 1133, 10 to 90 phr of aluminium phosphinate, and 100 to 190 phr of a metal hydroxide, wherein the composition is halogen-free.

7. The flameproofing combination according to claim 6, comprising 160 phr of aluminum hydroxide and 30 phr of aluminium phosphinate.

8. A process to treat plastics, rubbers, thermoplastic elastomers or thermoplastic vulcanizates, the process comprising adding a flameproofing combination according to claim 1 in the production of the plastic, rubber, thermoplastic elastomer or thermoplastic vulcanizate.

9. A process for the treatment of a cable, plastic molding material, resilient molding material, electrical coated conductors, adhesive, or floor covering, the process comprising adding a flame proofing combination according to claim 1 in the production of the cable, plastic molding material, resilient molding material, electrical coated conductor, adhesive, or floor covering.

* * * * *